United States Patent [19]

Page et al.

[11] Patent Number: 4,765,551
[45] Date of Patent: Aug. 23, 1988

[54] WINDING FORM

[75] Inventors: Teddy L. Page, Dayton; Alvin C. Banner, Kettering, both of Ohio

[73] Assignee: Statomat-Globe, Inc., Dayton, Ohio

[21] Appl. No.: 799,428

[22] Filed: Nov. 19, 1985

[51] Int. Cl.[4] ............................................. H02K 15/09
[52] U.S. Cl. ................................................. 242/7.05 B
[58] Field of Search .......... 242/1.1 E, 7.05 R, 7.05 B, 242/7.05 A, 1.1 R; 29/605; 140/92.1

[56] References Cited

U.S. PATENT DOCUMENTS

| | | | |
|---|---|---|---|
| 2,007,830 | 7/1935 | McNeill | 242/7.05 A |
| 2,895,960 | 7/1959 | Savard . | |
| 3,072,349 | 1/1963 | Busch et al. | 242/1.1 E |
| 3,101,910 | 8/1963 | Turk . | |
| 3,361,371 | 1/1968 | Dickensheets et al. . | |
| 3,713,598 | 1/1973 | Bucholtz et al. | 242/7.05 B |
| 3,785,580 | 1/1974 | Kennedy et al. | 242/7.05 B |
| 4,262,852 | 4/1981 | Dammar | 242/7.03 |
| 4,262,853 | 4/1981 | Dammar | 242/7.05 B |
| 4,320,564 | 3/1982 | Aida et al. | 29/33 L |
| 4,335,856 | 6/1982 | Fuzita | 240/7.05 B |
| 4,520,965 | 6/1985 | Kimura et al. | 245/7.05 B |
| 4,549,583 | 10/1985 | Orikasa | 140/92.1 |
| 4,579,291 | 4/1986 | Lombardi et al. | 242/7.05 B |

FOREIGN PATENT DOCUMENTS

| | | |
|---|---|---|
| 3318623 | 12/1983 | Fed. Rep. of Germany . |
| 810112 | 3/1959 | United Kingdom . |
| 2123860 | 2/1984 | United Kingdom . |

Primary Examiner—Stanley N. Gilreath

[57] ABSTRACT

A winding form of the type used with flier-type winding machines and of the type comprising a chuck body and a pair of side plates for guiding wire onto a dynamoelectric core to be wound has one or both side plates yieldably and pivotally mounted on the chuck body. The yieldably mounted side plates may be used for tightly winding coils or for preventing snagging of the wire on the core.

8 Claims, 3 Drawing Sheets

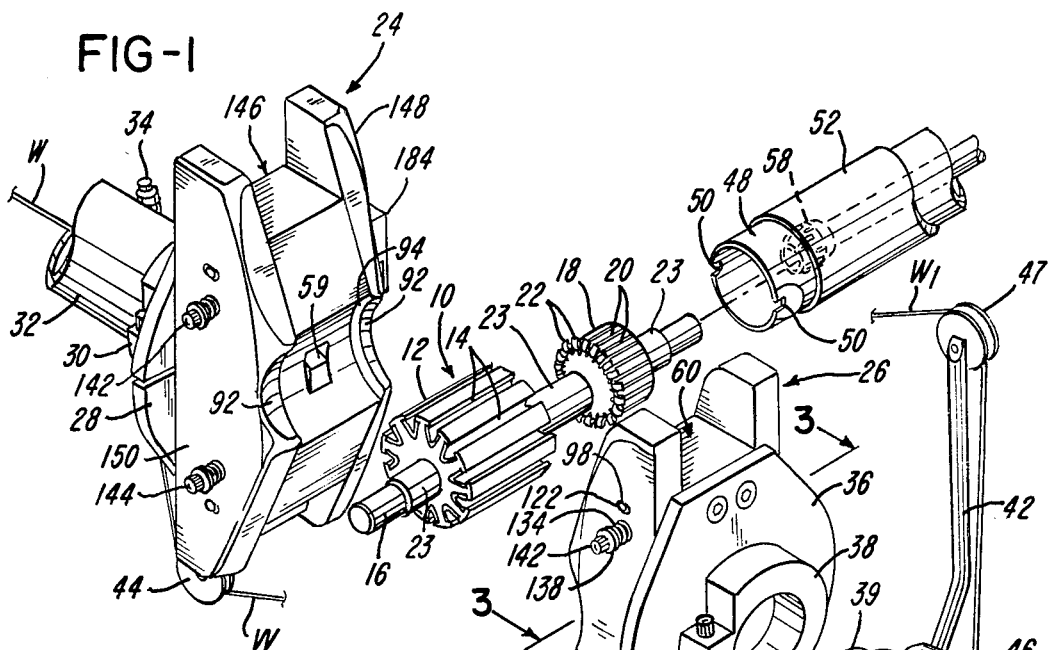
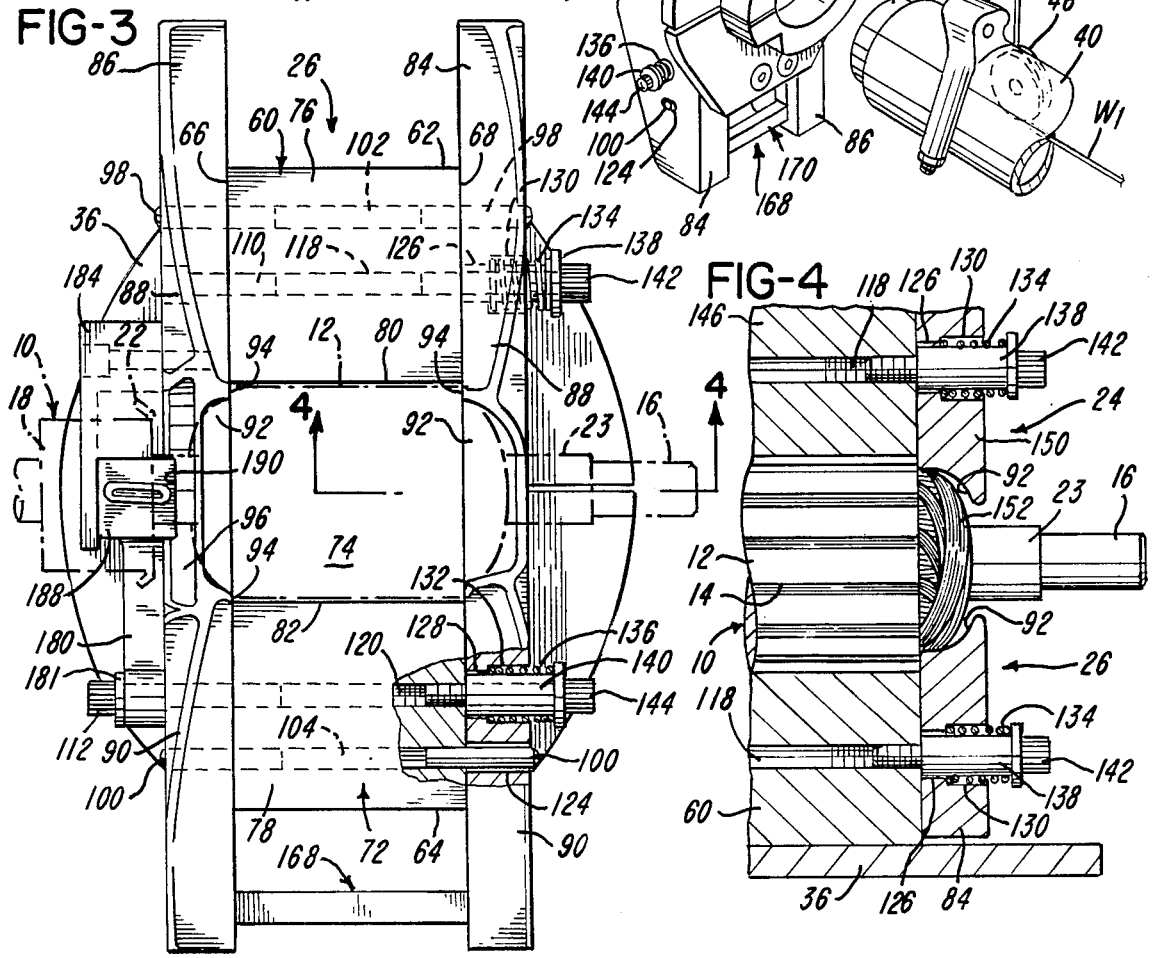

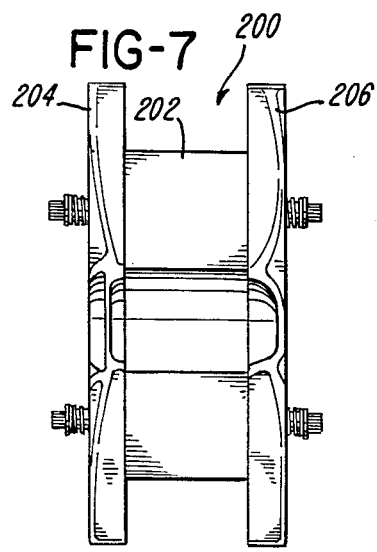
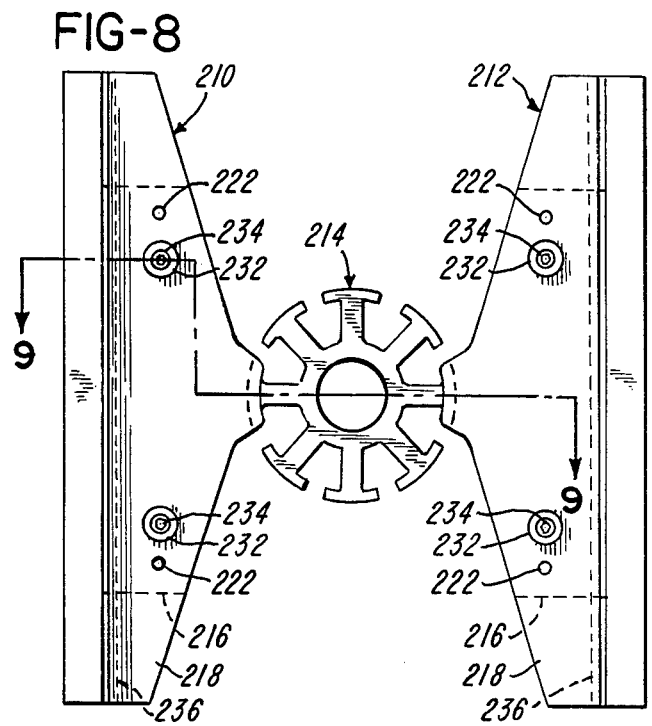
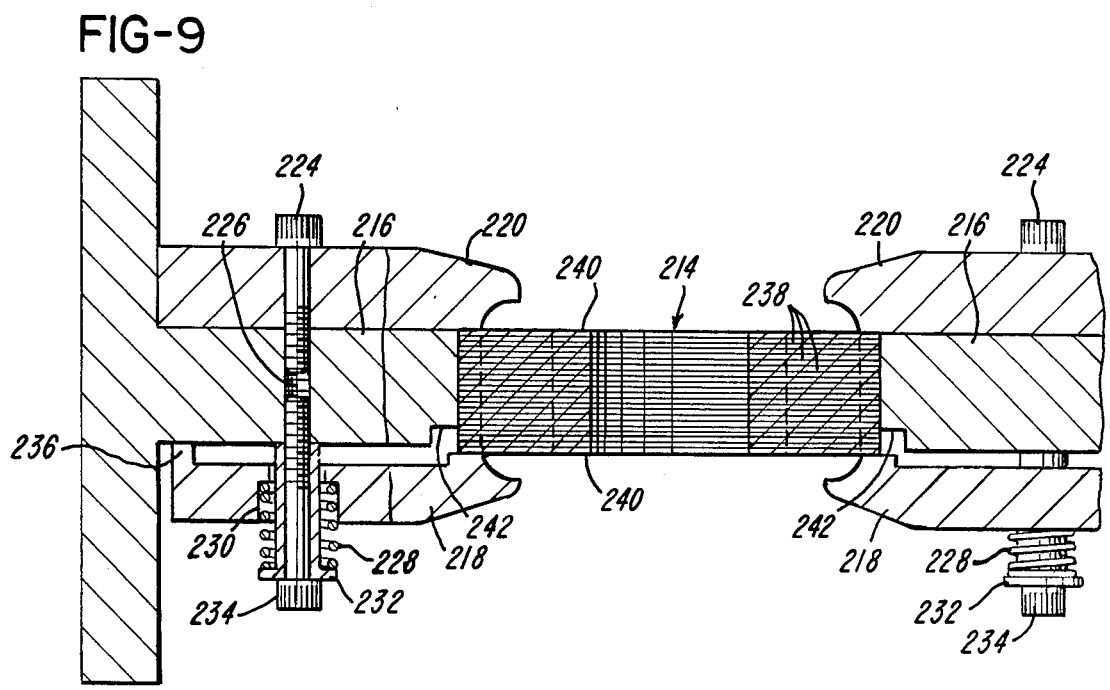

WINDING FORM

SUMMARY OF THE INVENTION

This invention relates to winding forms used with flier-type winding machines for the winding of coils of insulated wire onto cores of rotors of dynamoelectric devices, such as electric motors, alternators or generators, and particularly cores having generally axially disposed, radially outwardly opening coil-receiving slots. The winding forms of this invention are intended for use with double flier winding machines that are most generally used for winding armatures and are typically called "armature winders" but may also be used to wind other cores having radially outwardly opening slots, such as rotating cores carrying field coils. As will become apparent to those skilled in the art, the invention is not so limited and may be used with single or triple flier machines and other types of winding equipment utilizing one or more winding forms.

A conventional winding form comprises a unitary structure including a chuck body fixed between a pair of side plates. Both the chuck body and the side plates have highly polished surfaces over which the insulated wires are guided into the core slots. In a double flier winder, two such winding forms separately guide the wires wound into coils by the two fliers. The two winding forms also cooperate with one another to provide a chuck for at least partly supporting the core that receives the coils.

In a typical operation, the two fliers wind two coils simultaneously into four of the core slots. The parts of the coils laid axially along the core slots are called "side turns" and the parts of the coils spanning between the core slots along the end faces of the core are called "end turns". After the winding of a first pair of coils, the core may be repositioned for the winding of a second pair of coils. This procedure continues until all of the coils are wound. In the case of an armature, the start and finish ends of each coil are normally automatically connected to commutator bars as the winding progresses. After the winding is completed, insulating wedges or the like are normally inserted into the open, radially outermost portions of the coil-receiving slots to positively retain the coils therein and to insure that the coils are insulated from other parts of the dynamoelectric device.

Cores of dynamoelectric devices are usually made from a stack of laminations comprising formed, thin sheets of iron or the like and insulating end plates (called end fibers), and the axial length of a core is often termed its "stack height". A winding form is normally so constructed that its chuck body is slightly wider than the stack height of the cores to be wound so that the cores can fit between the side plates. The chuck body has sloping upper and lower wire-guide surfaces joining to a center, core-clamping section along apical edge surfaces designed to extend adjacent the entire axial length of the pairs of core slots into which coils are wound. The form side plates similarly have sloping upper and lower wire-guide surfaces joining to center, wire-guiding sections that partly straddle the core being wound and that are configured to guide the coil-forming wires into the ends of the coil-receiving slots and along the end faces of the core.

State-of-the-art double flier machines using conventional winding forms are entirely satisfactory for most winding applications. Occasionally, however, a "slot fill" problem arises wherein the coils being wound so completely fill the coil-receiving slots that the coils interfere with the insertion of the slot closing wedges, and some turns of the last wound coils may even project out of the slots. Another problem that may be encountered is that the coil-forming wires tend to be abraded by, or snag against, a surface of a core being wound, particularly adjacent the ends of the coil-receiving slot. In accordance with this invention, these problems are alleviated or overcome by improved winding forms and it is the primary object of this invention to provide improved winding forms useful for winding coils of wire onto cores of dynamoelectric devices.

The slot fill problem may be alleviated by forming the winding forms such that the side plate surfaces are separated from the end faces of the core by the least possible spacing. This spacing must be sufficient to accommodate the end turns as they build up. In cases to which this invention is addressed, the end turns build up to such an extent that the wire-guide surfaces of the side plates of conventional winding forms must be spaced so far from the core being wound that the first wound coils are not wound as tightly as is desirable to avoid excessive slot fill.

The problem of wire being abraded by or snagging against the core may result from too large a gap between the side plate guide surfaces and the end faces of the core being wound. Thus, the wire being wound into a coil may enter the gap and engage a core surface. One solution that may seem evident to this problem would be to reduce the separation between the confronting surfaces of the side plates so as to reduce the spacing, if any, between the side plate guide surfaces and the core. This may be acceptable in some circumstances. However, there are occasions wherein, because of tolerances in the stack height of the core, the side plates cannot be sufficiently close together to accommodate all cores to be wound and at the same time assuredly avoid wire abrasion or snagging.

A more specific object of this invention to provide an improved winding form for obtaining more tightly wound coils. A winding form in accordance with this invention has at least one side plate that is yieldable so that it may move away from the core being wound as winding of a core progresses. Preferably, the yieldable side plate is yieldably mounted on the chuck body and spring biased into engagement with the chuck body. An advantage of this construction is that the yieldably mounted side plate may be pushed away from the chuck body by the coil-forming wires as the end turns build up. Accordingly, when improved slot fill is sought, the winding form may be so constructed that the yieldably mounted side plate is, at the beginning of a winding cycle, closer to the core than would otherwise be possible so that better control of the coil being wound can be obtained and the coils may be more tightly wound. As a result, more space will be left in the coil-receiving slots after the winding is completed.

Another more specific object of this invention is to provide an improved winding form useful for preventing the coil-forming wires from snagging on the cores being wound. This may be accomplished by yieldably mounting and spring-biasing one or both side plates on the chuck body and, in a preferred embodiment, by making the core-engaging surface of the chuck body slightly narrower than the stack height of the cores to be wound. This enables the side plates to be positioned as close as possible to all of the cores to be wound having a stack height within normal tolerances and, when circumstances permit, the side plates can actually contact the ends of the core. Thus, the gaps between the side plates and the cores are minimized or removed entirely. As a result, the wires may be more reliably protected from engaging the core surfaces against which they might snag.

Yet another object of this invention is to provide an improved winding form having one or both side plates pivotally as well as yieldably mounted on the chuck body.

Slot fill problems may have various different solutions. For example, U.S. Pat. No. 4,459,742, issued to A. C. Banner on July 17, 1984, discloses methods and apparatus for achieving a greater slot fill than can be accomplished by conventional means. There may be cases wherein the use of winding forms of the present invention may be sufficient, simpler, and less expensive than other approaches to solving a slot fill problem, and there may be other winding applications which may advantageously use the winding forms of this inventions as well as other techniques for enhancing slot fill.

Other objects and advantages will become apparent from the following description and the drawings.

BRIEF DESCRIPTION OF THE DRAWINGS

FIG. 1 is a partially exploded, simplified, fragmentary perspective view of a double flier armature winding machine of the type which can be used in the practice of the present invention. FIG. 1 also shows an armature located between the winding forms thereof.

FIG. 3 is an elevational view of a single winding form with parts broken away and with an armature shown in phantom lines, as viewed generally in the direction of line 3—3 of FIG. 1.

FIG. 4 is a fragmentary cross-sectional view showing portions of both winding forms and an armature with parts broken away taken substantially along the line 4—4 of FIG. 3.

FIG. 7 is an elevational view of a single winding form similar to FIG. 3 but showing, in smaller scale, a modification thereof.

FIG. 8 is a fragmentary elevational view of another embodiment of a double flier winder showing a pair of winding forms and a dynamoelectric core member supported therebetween.

FIG. 9 is a fragmentary, cross-sectional view taken substantially along the line 9—9 of FIG. 8.

DETAILED DESCRIPTION

Figure 2:
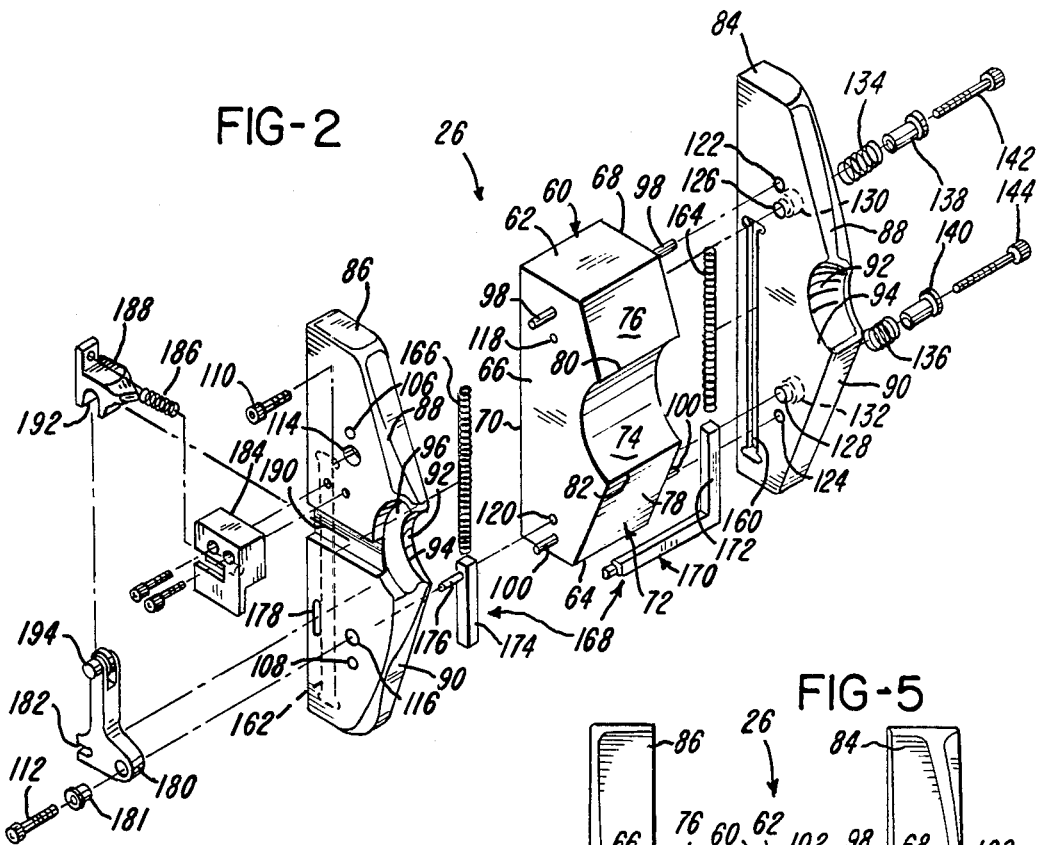
FIG. 2 is an exploded perspective view of a single winding form in accordance with the present invention.

Referring to FIG. 1, this invention is shown in connected with the winding of an armature of the type generally designated 10 including an armature core 12 having radially inwardly directed coil-receiving slots 14 mounted on an armature shaft 16. A commutator 18 is mounted upon the same shaft and has a plurality of segments 20 terminating in tangs or hooks 22. The section of the shaft 16 between the core 12 and the commutator 18 includes an insulating sleeve 23. Other insulating sleeves, also designated 23, abut the opposite ends of the core 12 and the commutator 18, respectively.

A portion of a double flier winding machine used for winding the armature 10 is shown in FIG. 1 and includes left and right side wire guide winding forms, designated 24 and 26, respectively, that receive the armature core 12 therebetween. The left side winding form 24 is mounted upon a mounting or backing plate 28 provided with a bearing housing or clamp 30 affixed to the outer race of a bearing (not shown) on the end of a flier spindle 32 on which is affixed a flier 34. The right side winding form 26 is similarly mounted on a backing plate 36 having a bearing housing or clamp 38 mounted on the outer race of a bearing 39 on the end of a flier spindle 40 for a right side flier 42. Here it may be noted that positional terms used herein, such as left and right and vertical and horizontal, are relative and not absolute.

As conventional, a strand of insulated wire, designated W, is dereeled from a supply spool (not shown) and coursed through the left side spindle 32 around a wire exit pulley (not shown) mounted for rotation thereon and a flier pulley 44 mounted for rotation at the terminal end of the flier 34. Another strand of insulated wire $W^1$ passes through the right side spindle 40 and around a wire exit pulley 46 to a right side flier pulley 47 at the free end of the flier 42. Appropriate machine elements and control devices (not shown) are provided for spreading the winding forms 24 and 26, i.e., moving them apart from one another, when an armature is inserted or removed, for rotating the fliers 34 and 42 in proper timed sequence, and for indexing or rotating the armature 10 as required to present new pairs of slots in position to receive coils wound by the fliers.

In operation, the fliers 34 and 42 are simultaneously rotated in opposite directions to wind a pair of coils into pairs of spaced slots 14. Thus, with reference to the orientation of parts as viewed in FIG. 1, the left side flier 34 may rotate in a "top coming" direction while at the same time the right side flier 42 rotates in a "top going" direction. One or two coils are typically wound in each pair of slots 14 and the armature 10 then repositioned about its longitudinal axis to place different pairs of slots 14 in location to have coils wound therein. These procedures continue until the armature 10 is fully wound.

During the intervals in which the fliers 34 and 42 are rotating to wind coils, it is necessary to shield the commutator tangs 22 so that the wires are not accidentally hooked thereover. For this purpose, a hollow, cylindrically tubular, inner commutator shield 48 is partially illustrated which, in use, surrounds the commutator 18. The shield 48 has a pair of diametrically opposed notches 50 that expose the two diametrically opposed tangs 22 located in the horizontal plane passing centrally through the armature. The tangs 22 exposed by the notches 50 are covered by a tubular, outer commutator shield 52 mounted for sliding movement in surrounding relation to the inner shield 48. When lead wire connections are to be made, the outer shield 52 is retracted to also expose the generally horizontally located tangs 22 aligned with the notches 50.

After an armature is completely wound and the finish wires connected to the commutator, the segments of the wires W and $W^1$ leading from the commutator to the fliers are usually gripped by suitable clamps (not shown) and then severed so that the wound armature may be removed from the winding station and replaced by an unwound armature. The wire clamps and the means for severing the wires are not illustrated herein, such devices being well known and forming no part of this invention.

Armatures located in the winding station are gripped by a collet 58 that forms part of an armature rotator mechanism that may be of known construction. The use of rotators with collets to hold armatures in winding stations and rotate the armatures about their axes is now conventional. Examples of the same are shown in U.S. Pat. No. Re. 27,893, granted to Jerry E. Miller on Jan. 22, 1974; U.S. Pat. No. 3,524,601, granted to John M. Biddison and Otto F. Steinke on Aug. 18, 1970; U.S. Pat. No. 3,673,878, granted to John M. Biddison on July 4, 1972; and others. Apparatus for controlling armature rotators to rotate the armatures gripped by a collet through the desired angles and at the desired times are also conventional. One such apparatus is shown in U.S. Pat. No. 3,673,878. More recently developed electronically controlled rotators, which are well known and widely used in the art, could also be used.

In FIG. 1, the left winding form 24 is shown provided with a back-up pawl 59 which is spring biased to enter successive core slots to insure that the armature being wound is properly angularly oriented. Said U.S. Pat. No. 3,673,878 more fully shows such a pawl which is identified by reference number 58 therein.

Here it may be observed that the winding machine of FIG. 1 is only one example of the environment in which the winding forms of this invention may be used. Those familiar with the art will recognize that, except for the winding forms, the machine may be entirely conventional and parts of the machine may be varied to suit the practices of the manufacturer.

Referring now to FIG. 2, the right side winding form 26 comprises a chuck body 60 which is generally in the form of a rectangular solid and has planar top and bottom surfaces 62 and 64, respectively, planar front and rear faces 66 and 68, and a planar right side (as viewed in FIG. 1) face 70. (For convenience of description, "rear" is considered to be toward the collet 58 although that will not necessarily be true in actual practice.) The left side or armature-engaging face, designated 72, of the chuck body 60 is contoured to engage the armature core 12 and to assist in guiding the wire $W^1$ from the right side flier 42 into the core slots 14. Thus, the armature-engaging face 72 has, at its midsection, a concave, circularly arcuate, armature core-clamping surface 74 and planar upper and lower wire guide surfaces 76 and 78, respectively, that slope outwardly from the top and bottom faces 62 and 64, respectively, to apical edge surfaces 80 and 82, respectively, bounding and joining to the core-clamping surface 74. As usual, the apical edge surfaces 80 and 82 are formed to extend adjacent to the entire axial length of the pairs of core slots 14 into which a single coil is to be wound by the right side flier 42.

With continued reference to FIG. 2, the right side winding form 26 further comprises a pair of side plates, namely a front side plate 84 and a rear side plate 86, each of which has sloping upper and lower wire-guide surfaces 88 and 90, respectively, that are coplanar with the chuck guide surfaces 76 and 78, respectively, and that join to a center wire-guiding section 92. Each center section 92 is in the form of an arcuate, recessed pocket constructed to lie adjacent an end of the core 12. Center section 92 guides the coil-forming wires to form the coil end turns and also guides the wires as they enter into selected core slots. Section 92 is contoured to allow for a build-up of the coil end turns. In addition, the rear face of the rear side plate 86 has a centrally located, arcuate recess 96 to provide space for the shields 48 and 52. In the embodiment shown in FIGS. 1 through 6, the width of the chuck body 60 is, in accordance with common practice, slightly greater than the stack height of the core 12 so that the core 12 may readily be inserted between arcuate surface portions 94 of the side plates 84 and 86 immediately adjacent the center sections 92. As those familiar with the art will be aware, the sloping, wire-guiding surfaces 76 and 78 of the chuck body 60, the sloping wire-guiding surfaces 88 and 90 of the side plates 84 and 86, and the center sections 92 thereof, are highly polished to avoid abrasion of the insulated wires W and $W^1$ as they are being guided into the armature slots 14. Also, it will be understood that the illustration of the wire-guiding surfaces of the side plates 84 and 86 are representative. In practice, craftsmen carefully contour these surfaces as needed to accurately guide the wires W and $W^1$ into the core slots.

The side plates 84 and 86 are aligned with the chuck body 60 by means of an upper pair of alignment pins 98 and a lower pair of alignment pins 100 that project outwardly from upper and lower bores 102 and 104 that extend through the chuck body 60 between its front and rear faces. The rear side plate 86 has upper and lower alignment apertures 106 and 108 that receive the rearwardly extending alignment pins 98 and 100, respectively, and is affixed to the rear face 66 of the chuck body 60 by an upper screw 110 and a lower screw 112 that extend through apertures 114 and 116 in the rear side plate 86 into threaded ends of upper and lower bores 118 and 120 which extend through the chuck body 60 adjacent the alignment pin bores 102 and 104. Such fixed mounting of a side plate is conventional.

The front side plate 84 has upper and lower alignment apertures 122 and 124 that receive the forwardly projecting alignment pins 98 and 100. However, in accordance with this invention, the front plate alignment pin apertures 122 and 124 are oversized to allow for some movement between the front side plate 84 and the chuck body 60. Moreover, the front side plate 84 is yieldably mounted on the chuck body 60 in the fashion illustrated in FIGS. 3 through 6. Thus, the front side plate 86 is provided with upper and lower bores 126 and 128, respectively, which have enlarged counterbores 130 and 132, respectively, which provide pockets for coil springs 134 and 136, respectively, through which protrude bushings 138 and 140, respectively, that abut against the front face 68 of the chuck body 60. Passing freely through the bushings 138 and 140 are threaded socket head screws 142 and 144, respectively, which pass rearwardly, i.e., to the left as appears in FIG. 2, through the bushings 138 and 140, springs 134 and 136, and through the front side plate 84 to threadedly enter the rearward, internally threaded ends of the same bores 116 and 118 to which the rear side plate 86 is connected. The bushings 138 and 140 have flanged outer ends which cooperate with the bases of the counterbores 130 and 132 to retain the coil springs 134 and 136 on the bushings 138 and 140, whereas the bushings 138 and 140 are held in place by the enlarged heads of the screws 142 and 144.

Aside from whatever differences may be needed in the contour of the wire-guiding surfaces of the side plates, and the addition of the back-up pawl 59, the left side winding form 24 is constructed identically to the right side winding form 26, but is the mirror image thereof. Thus, the right side winding form 24 has a chuck body 146 bounded by a fixed rear side plate 148 and a yieldably mounted front side plate 150. Since the construction is otherwise identical, other parts of the right side winding form 24 are identified in the drawings by the same reference numbers as the like parts of the left winding form 26.

In operation, an armature 10 to be wound with the apparatus illustrated in FIGS. 1 through 6 is wound using winding patterns which may be well known in the art and using appropriate techniques for making commutator connections and handling the start and finish wires. At the commencement of the winding, the coil springs 134 and 136 bias the front, yieldable winding form side plates 84 and 150 tightly into engagement with their associated chuck bodies 60 and 146. As the winding progresses, the end turns of the coils build up and push against the yieldably mounted front winding form side plates 84 and 150 whereupon the springs 134 and 136 yield to permit the front winding form side plates 84 and 150 to move so that their center section 92 move forwardly, away from the core 14 of the armature being wound, to accommodate the accumulating coil end turns.

The manner in which the yieldable side plates 84 and 150 move to accomodate the build up of end turns is illustrated in FIGS. 3 through 6. Thus, FIG. 3 illustrates the right side winding form 26 after a few coils have been wound in an armature shown by phantom lines therein. There it will be observed that the yieldable side plate 84 is flush with the chuck body 60. FIG. 4 illustrates the same condition of both yieldable winding form side plates 84 and 150. FIG. 4 also shows the beginning of the build up of coil end turns, designated 152.

Figure 6:
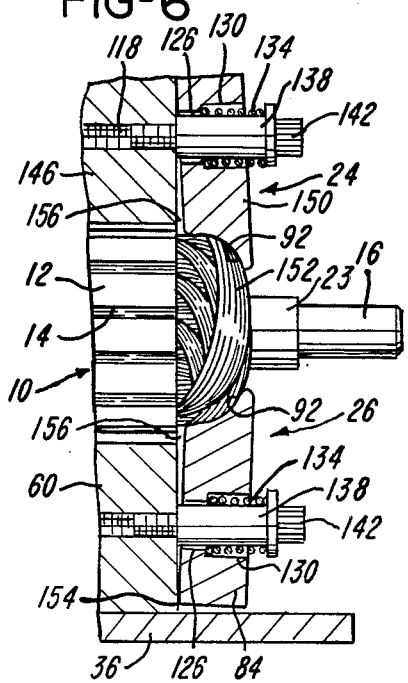
FIG. 6 is a fragmentary cross-sectional view similar to FIG. 4 with parts broken away taken substantially along the line 6—6 of FIG. 5.
Figure 5:
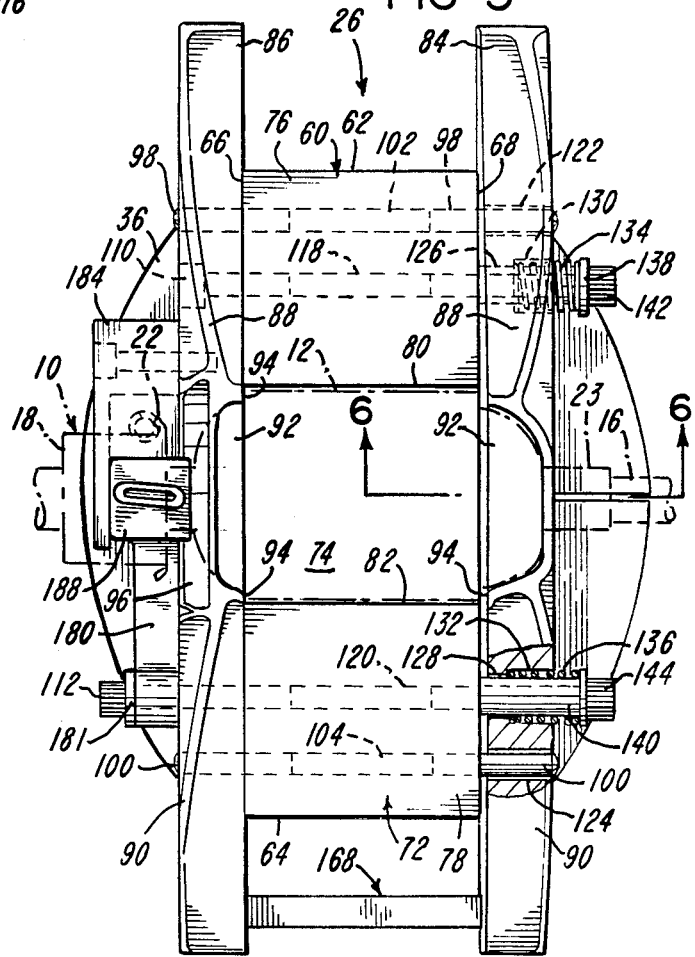
FIG. 5 is a fragmentary elevational view similar to FIG. 3 showing the parts at a different time during the winding sequence.

FIGS. 5 and 6 illustrate a later stage in winding at a time when the accumulation of coil end turns 152 has increased to the point that the center sections 92 of the yieldable side plates 84 and 150 have been pushed away from the armature core 14. This has caused the yieldable side plates 84 and 150 to pivot about surface portions, designated 154 in FIG. 6, of the chuck bodies 60 and 146 near their respective backing plates 28 and 36. Thus, one can see in FIGS. 5 and 6 that the springs 134 and 136 are now being compressed and the wire guiding edges of the side yieldable side plates 84 and 150 have moved away from their associated chuck bodies 60 and 146, respectively, so that there is a gap, designated 156, therebetween. Gap 156 is shown slightly exaggerated. Typically, its maximum width will be on the order of 0.04 inch or less. In FIG. 6 it will be observed that the pivotal movement of the side plates 84 and 150 is accommodated by the oversized inside diameter of the bores 126.

The practice of the present invention allows the yieldable winding form side plates 84 and 150 to be so constructed that their center sections 92 lie closer to the forward end face of the armature core 14 than is possible using side plates affixed to their chuck bodies. Accordingly, the coils of wire may be wound more tightly than is possible with conventional winding forms. As a result, the total build up of the forward end turns 152 is reduced and the coil side turns are more compactly arrayed in the armature core slots.

Many winding applications require the use of wire guides for insuring that the wires are hooked about the commutator tangs. The practice of this invention does not interfere with the use of such guides. With reference to FIG. 2, the winding form 26 is shown provided with a type of wire guide that has been used for several years and is generally similar to the wire guide apparatus shown in FIGS. 7 and 8 of U.S. Pat. No. 3,713,598, granted to Glen E. Bucholtz and James N. Doyle on Jan. 30, 1973. Thus, the side plates 84 and 86 have elongated slots 160 and 162, respectively, for the receipt of springs 164 and 166, respectively, in the upper portions thereof. A U-shaped wire guide actuator, generally designated 168, is provided with a cross piece 170 having one leg 172 slideably mounted in the lower portion of the slot 160 of the front side plate 84. The guide actuator 168 further comprises a drive rod 174 abutted by the opposite end of the cross piece 170. The drive rod 174 is slideably mounted in the slot 162 in rear side plate 86 and has a drive pin 176 at its upper end entering a vertical slot 178 in the rear side plate 86. A wire guide finger 180 is pivotally mounted on a bushing 181 held by the lower mounting screw 112 against the rear side plate 86. Wire guide finger 180 has a slot 182 which slidably receives the drive pin 176. A wire guide tip retainer 184 is mounted on the rear side plate 86 for retaining a return spring 186 engaging a wire guide tip 188. The wire guide tip 188 is shaped for sliding movement transversely in a slot 190 located in the rear side plate 86 and has an inverted U-shaped pocket 192 for receiving a roller 194 which is a part of the wire guide finger 180.

Suitable drive means such as, for example, an air actuator (not shown), is provided for driving the U-shaped wire guide actuator 168 upwardly against the bias of the springs 164 and 166. As a result, the wire guide tip 188 is actuated into position to partly shield a commutator hook so as to guide the wire therearound. When the air actuator force driving the wire guide actuator 168 upwardly is relaxed, the compression springs 164 and 166 return the U-shaped wire guide actuator 168 downwardly, whereupon the wire guide tip 188 is retracted from its wire guiding position. Since the wire guide structure is known in the art, it is not further described herein. However, it may be noted that the yieldable mounting of the side plate 84 does not affect the operation of the wire guide actuator since the slot 160 may be slightly oversized with respect to the leg 172 to permit movement therebetween as the side plate 84 pivots.

FIG. 7 schematically illustrates another embodiment of a winding form 200 in accordance with the present invention to both side plates associated with a given chuck body 202 to be yieldably pivotal outwardly from the body of the chuck body 202 as the winding proceeds. Thus, there is illustrated a pivotal front side plate 204 and a pivotal rear side plate 206 equipped with the same bores, bushings, springs, socket head screws, and other parts such as already described in the embodiment of FIGS. 1 through 6, to yieldably mount the same. The yieldable mounting of both side plates 204 and 206 may offer advantages for some winding applications. Although FIG. 7 does not show a wire guide assembly, one may be provided which may be identical to the assembly described immediately above.

FIGS. 8 and 9 show another embodiment of winding forms, generally designated 210 and 212, used for winding coils (not shown) on a rotating field member core 214, and constructed to avoid snagging of the coil-forming wires (not shown) on the core 214. Each of the winding forms 210 and 212 comprises a chuck body 216, a front side plate 218, and a rear side plate 220. In this case, the chuck body 216 is T-shaped, its base being adapted for mounting on a backing plate (not shown) as will be apparent from the foregoing description. During assembly the side plates 218 and 220 are held in alignment with the chuck body 26 by alignment pins 222 and the rear side plate 220 is affixed to the chuck body 216 by a pair of mounting screws 224 (only one of which is shown for each winding form in FIG. 9) that threadedly engage within tapped bores 226 in the chuck body 216. Each front side plate 218 is yieldably and pivotally mounted on its associated chuck body 216 in the manner described with reference to FIGS. 1 through 6, i.e., by compression coil springs 228 confined within counterbores 230 by flanged bushings 232. The bushings 232 are affixed to the chuck bodies 216 by screws 234 passing therethrough and into the same tapped bores 226 as the rear side plate mounting screws 224. In this embodiment the front side plates 218 are provided with flanges 236 that engage the sides of the chuck bodies 216 near the bases thereof at lines about which the front plates 218 may pivot.

In FIG. 9 the core 214 is shown to comprise a plurality of thin laminations 218 and end plates 240. Because of tolerances in the thickness of the individual laminations 238 and in the number of laminations 238 forming a given core, the stack heights of cores 214 to be wound may vary by several thousandths of an inch from core to core. The winding forms 210 and 212 are designed to maintain the winding form side plates engaged with the end faces of each core 214 to be wound. Thus, the rear face of the core 214 is abutted against the forward faces of the rear side plates 220 when the core is first inserted into position to be wound. The front side plates 214 will, of course, be biased by the coil springs 228 into engagement with the front end face of the core 214. Accordingly, fairly substantial differences in the stack heights of the cores 214 can be accomodated. In FIG. 9 it will be noted that the chuck bodies have step portions 242 so that the front side plates 218 will necessarily engage the core 214. It will be understood that there may be requirements for the side plates to be spaced from the core in which event the side plates would rest against the sides of the chuck bodies as in the previously described embodiments.

Although the presently preferred embodiments of this invention have been described, it will be understood that within the purview of this invention various changes may be made within the scope of the appended claims.

Having thus described our invention, we claim:

1. For use with a flier-type winding machine for winding slotted cores of dynamoelectric devices, a winding form comprising a chuck body having a first side and a second side spaced from said first side, said first and second sides facing oppositely from one another, first side plate means for guiding wire into one end of the slots of said cores, second side plate means for guiding wire into the opposite end of said slots, and mounting means mounting said first side plate means on said first side, in generally parallel relation to said second side plate means, said mounting means including bias means yieldably biasing said first side plate means toward said chuck body so that said first side plate means may move toward and away from said second side plate means.

2. The apparatus of claim 1 further comprising second mounting means including second bias means yieldably biasing said second side plate means toward said chuck body.

3. The apparatus of claim 1 wherein said mounting means comprises a bushing passing through said first side plate means, and fastener means passing through said bushing and fixedly attaching said bushing to said chuck body, and wherein said bias means comprises coil spring means encircling said bushing.

4. The apparatus of claim 3 wherein said second mounting means includes second means yieldably biasing said second side plate means toward said chuck body.

5. The apparatus of claim 3 wherein said mounting means further comprises a second bushing passing through said first side plate means, and second fastener means passing through said second bushing and fixedly attaching said second bushing to said chuck body, and wherein said bias means further comprises second coil spring means encircling said second bushing.

6. A winding form for guiding wire into outwardly opening slots of the laminated cores of dynamoelectric members during the winding of coils therein comprising:

a chuck body having a first side and a second side spaced from said first side, said first and second sides facing oppositely from one another, first side plate means for guiding wire into one end of the slots of said cores on said first side of said chuck body, second side plate means for guiding wire into the opposite end of said slots on said second side of said chuck body in generally parallel relation to said first side plate means, and spring means yieldably biasing said first side plate means tightly into engagement with said chuck body but permitting said first side plate means to yieldably move away from said chuck body as the winding of coils progresses as a result of the coils building up and pushing against said first side plate means.

7. The apparatus of claim 6 further comprising second spring means yieldably biasing said second side plate means tightly into engagement with said chuck body but permitting said first side plate means to yieldably move away from said chuck body as the winding of coils progresses as a result of the coils building up and pushing against said first side plate means.

8. A winding form for guiding wire into outwardly opening slots of dynamoelectric core members formed from a stack of laminations having oppositely facing end surfaces during the winding of coils therein comprising:

a chuck body having a first side and a second side spaced from said first side, said first and second sides facing oppositely from one another, first side plate means on said first side, second side plate means on said second side in generally parallel relation to said first side plate means, said side plate means being so located on said chuck body that mutually confronting, stack-engaging surface portions thereof engage, respectively, the oppositely facing end surfaces of said stack of laminations during winding, and spring means yieldably mounting said first side plate means on said body so that said stack-engaging surface portions of said first side plate means may move toward and away from said second side plate means as needed to accomodate variations in the thickness of said stack.

* * * * *